United States Patent [19]
Hudgins

[11] 3,977,812
[45] Aug. 31, 1976

[54] COMPOUND HELICOPTER DRIVE MEANS

[75] Inventor: Wayne A. Hudgins, Hampton, Va.

[73] Assignee: The United States of America as represented by the Secretary of the Army, Alexandria, Va.

[22] Filed: Nov. 17, 1975

[21] Appl. No.: 632,340

[52] U.S. Cl. ............................ 416/123; 416/169 R; 416/170 R; 244/17.19
[51] Int. Cl.[2] .......................................... B64C 27/22
[58] Field of Search ........... 244/17.13, 17.19, 17.21, 244/6, 7 R, 7 A; 416/123, 169, 170; 74/665 H, 665 F, 674, 695, 710.5, 764, 788, 789, 785, 792

[56] References Cited
UNITED STATES PATENTS

| | | | |
|---|---|---|---|
| 1,154,769 | 9/1915 | Hertzberg | 74/764 |
| 2,401,365 | 6/1946 | Mercier | 416/170 |
| 2,771,143 | 11/1956 | Campbell | 416/123 |
| 2,838,913 | 6/1958 | Peterson et al. | 416/170 |
| 2,890,604 | 6/1959 | Campbell | 74/764 |
| 3,190,414 | 6/1965 | Maurer et al. | 74/785 |
| 3,468,192 | 9/1969 | Nasvytis | 74/764 |
| 3,540,680 | 11/1970 | Peterson | 244/17.19 |
| 3,679,033 | 7/1972 | Wagner | 244/17.21 |
| 3,851,546 | 12/1974 | Kepple et al. | 74/785 |

Primary Examiner—Trygve M. Blix
Assistant Examiner—Galen L. Barefoot
Attorney, Agent, or Firm—Norman L. Wilson, Jr.

[57] ABSTRACT

Compound helicopters, those having a rotor blade and a small wing, possess a rear propulsion propeller adjacent to the tail rotor. The tail gearbox is driven through a drive train coupled to the main rotor drive shaft. In such aircraft the tail rotor is in operation when the propulsion propeller is turning, and vice versa. A mechanism is provided herein for stopping or feathering the tail rotor when driving the propulsion propeller, or for stopping the propulsion propeller when the tail rotor is in operation.

6 Claims, 2 Drawing Figures

COMPOUND HELICOPTER DRIVE MEANS

BACKGROUND OF THE INVENTION

This invention relates to so-called compound or hybrid aircraft, that is, those having both a main rotor and a small wing.

Compound helicopters such as the Cheyenne (AH-56A) have a main and tail rotors, but in addition they possess a small fixed wing and a rear propulsion propeller adjacent to the tail or antitorque rotor. The tail gearbox is driven through a drive train coupled to the main rotor drive shaft. Such aircraft are capable of both hover and high speed forward flight, but they require a large vertical lift force in hover, and a large horizontal thrust force at high forward speeds. For a winged compound helicopter which utilizes a pusher propeller for horizontal thrust, the hover and low speed propulsive forces are provided by the helicopter main rotor, with anti-torque/directional control being provided by a smaller tail rotor. In this hover and low speed flight regime both main rotor and tail rotor thrust requirements are high, with the pusher propeller rotating but producing no thrust. In the high speed forward flight regime, part of the required lift is transferred from the main rotor to the wing and directional control is obtained through normal aircraft control surfaces, thus eliminating the need for tail rotor thrust. Forward propulsive force is generated by the pusher propeller.

Generally, during high speed flight a compound helicopter requires full power to the pusher propeller, located at the extremity of the aft fuselage, with no thrust required from the tail rotor. Likewise in low speed and hover flight the tail rotor power requirement is approximately ten percent of total aircraft power with the remaining power being absorbed by the main rotor, which provides the required lift. This is generally true for all sizes of compound helicopters.

In an aerodynamically optimized tail drive propeller/rotor system it can be found that the propeller normally operates at speeds of approximately fifteen percent higher than the tail rotor. Thus in the high speed crusing flight regime almost the entire engine output is fed to the tail gearbox to drive the propulsion propeller, the main rotor absorbing only a small percentage of the lift and horsepower. As a consequence the anti-torque or tail rotor is also driven, requiring consumption of power, and producing increased drag. Insofar as I have been able to determine means are not known for stopping or feathering the tail rotor when driving the pusher propeller, or, conversely, stopping or slowing the pusher propeller, when the tail rotor is in operation.

It can be seen that present dynamic drive system design for compound aircraft requires that the three propulsive devices, the main rotor, tail rotor, and pusher propeller, be rotated continuously during all flight modes. Having either the tail rotor or pusher propeller rotating when it is not required to produce a propulsive force reduces the overall operational efficiency through decreasing power available, increasing fuel consumption, producing unnecessary aerodynamic drag, and creating unnecessary wear (life cycles). A compound helicopter tail drive means is provided herein which will eliminate the major power losses associated with the kinematics of nonfunctional components during all flight modes, and low only operation of those components, when required during the various high speed, low speed, and hover modes of the aircraft.

SUMMARY OF THE INVENTION

In accordance with the practice of this invention aerodynamic drag in a compound helicopter is reduced in all modes of operation. As a consequence aircraft fuel consumption and noise are also reduced. This is accomplished by disengaging, slowing, or stopping the propulsion devices when they are not in use by means of novel drive means therefor. A single planetary gear set is employed with its three relatively rotatable gear members. The first gear member of the planetary set is adapted to be driven by the helicopter engine. The second gear member is adapted to drive the anti-torque tail rotor, and the third gear member is adapted to drive the propulsion propeller. Brake means are provided for the second and third gear members so that the tail rotor or pusher propeller can be feathered or stopped as desired.

DETAILED DESCRIPTION OF THE INVENTION

In effect this invention is concerned with a tail propeller/rotor drive gearbox (transmission) and drive select device for use on compound helicopters. It includes a combined planetary gear train and rotary braking device for engagement and disengagement of the independent propulsion devices, propeller and tail rotors, on a compound helicopter in order to reduce aerodynamic drag. The planetary gear train is the type including a central sun gear, a plurality of spur-type planetary gears engaging the sun gear and an outer ring gear internally engaging the planet gears. As will be seen in a moment from the drawing, means are included for driving the sun gear by the helicopter engine, for driving the propulsion propeller by the planet gears, and for driving the tail rotor by the ring gear. It will also be seen that calliper brake means are provided for both the propeller drive means and the tail rotor drive means.

For a more complete understanding of the combination of a planetary gear train and brake means the accompanying drawing is provided showing a preferred embodiment of the invention. For simplification the figures are diagramatic in nature, omitting suspension means, lubricating means and other engineering details known to those skilled in the art.

Figures 1, 2:
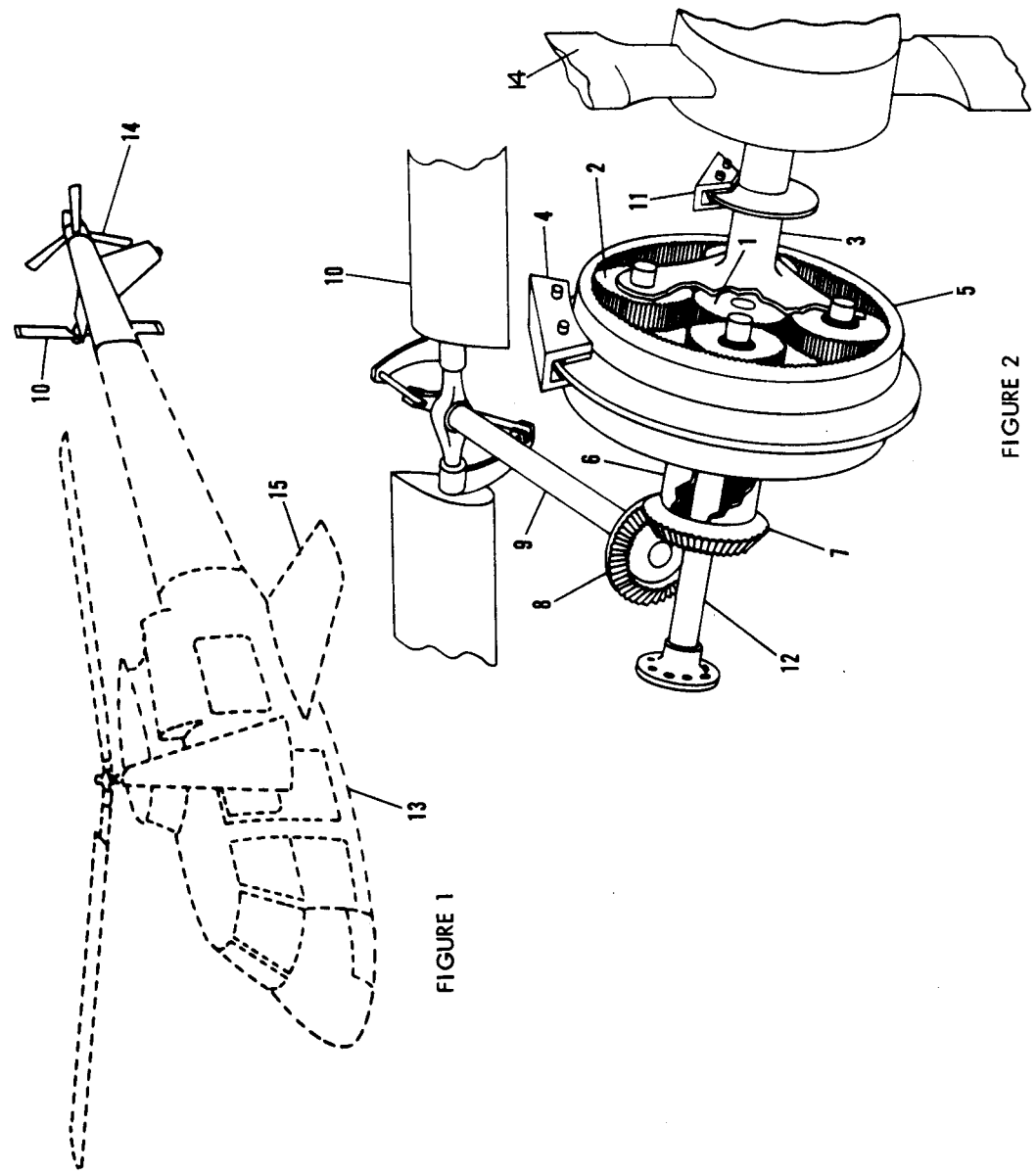
FIG. 1 is a phantom drawing showing a compound helicopter.
FIG. 2 is a diagramatic view showing a gear train and brake means.

Referring first to FIG. 1, a compound helicopter 13 is shown having a fixed wing 15, a tail or anti-torque rotor 10, and an adjacent propulsion or pusher propeller 14. Current compound helicopters are subject to the disadvantage that both rotors are in operation in all flight regimes. These tail pusher blades when not being used to propel the aircraft absorb as high as 2½% of the total aircraft installed power, which is a large factor in the overall inefficiency of the aircraft's operation.

I have discovered that the best way to overcome these limitations of a compound helicopter is to lock-out the power absorbing device when not in functional use. My preferred means for accomplishing this are shown in FIG. 2. Connected to the power take-off shaft, not shown, is input power shaft 12 of my rotor and propeller drive means. Mounted on the end of shaft 12 is sun gear 1. Geared to sun gear 1 to be driven thereby are planet gears 2. These spur gears drive outer ring gear 5, internally geared to engage planet gears 2.

Coupled to planet gears 2 is a drive shaft 3 which drives propeller 14. To drive tail rotor 10 an outer sleeve drive shaft 6 concentric with input power shaft 12 is provided. Bevel gears 7 and 8 connect sleeve drive shaft 6 to tail rotor drive shaft 9.

One of the features of this invention is the braking means employed. Two brake sets, preferably of the calliper type, are provided, adapted to be applied essentially one at a time. By this is meant that limited overlapping application of the brakes may at times be desirable. Shown in FIG. 2 of the drawing are disc brakes 4 and 11. In disc brake 11, the disc surrounds, and is welded or otherwise fixed to, propeller shaft 3. The disc of tail rotor brake 4, as will be apparent from the drawing, is a strengthening element of the ring gear 5. The disc is integral therewith being formed as a rib thereof to save weight. The discs are thus coaxial, but axially offset. With both discs callipers with friction pads are used on opposite sides of the peripheries of each disc. As will be understood by those skilled in the art suitable struts or other positioning and supporting means will be used to hold the callipers in place.

Referring now to the operation of the drive means of the invention, input power shaft 12, operating at the desired speed, is provided from the aircraft main transmission and drives a sun gear 1 of a planetary gear train. The sun gear drives the planet gears 2, and in turn propeller drive shaft 3. Operation in high speed flight is accomplished when the rotary disc brake 4 attached to planetary ring gear 5 is actuated, locking the ring gear 5 and providing the proper gear ratio for propeller operation. Attached also to the ring gear 5 is shaft 6 and a right angle spiral bevel gear 7 which is provided for the transmission of power to the tail rotor 10 for use during low speed and hover flight. In order to provide low speed and hover control thrust from the tail rotor 10, the rotary brake 4 is released and rotary brake 11 is applied, thus stopping and holding planet carrier 2. Power is then transmitted through the ring gear 5, which drives shaft 6. An integral part of shaft 6 is a spiral bevel pinion gear 7 which in turn drives bevel gear 8. Power is then transmitted through shaft 9 to tail rotor 10. This process is then reversed for the changing from low speed operation into the high speed operation mode.

It can be seen that several advantages are achieved through the use of the drive means of this invention. A particular advantage is that disc brakes are self-cleaning, which is important in the case of helicopters. Other advantages are: minimum aerodynamic drag; minimum power consumption; minimum fuel consumption per aircraft flight; more power available for emergency; reduced component maintenance; increased component life; reduced life cycle cost; improved mechanical efficiency; increased aircraft payload capability; reduced structural load cycles; variable speed engine operation not required; more precised aerodynamic control; and reduced noise level. It is apparent too that the propeller to tail rotor gearing ratio of 2:1 to 3:1 permits the advantages to be obtained without a clutch or a compound planetary gear set. It will also be obvious that the gear sets employed must be enclosed in suitable gear boxes with lubricants, and seals preventing the loss of those lubricants. In addition modifications will occur to those skilled in the art. For instance the disc brakes can be placed in or exposed to rotor and propeller induced airflow to assist in keeping the discs cool during braking, and the brakes can be used so that the propeller or rotor is not always completely stopped when the other is in operation. Such variations are within the scope of this invention.

What is claimed is:

1. In a compound helicopter having an anit-torque tail rotor and an adjacent rear propulsion propeller adapted to be coupled to a helicopter engine, rotor and propeller drive means therefor comprising a single planetary gear set with its three relatively rotatable gear members, its first gear member being adapted to be driven by the helicopter engine, its second gear member being adapted to drive the anti-torque tail rotor, and the third gear member being adapted to drive the propulsion propeller, in combination with brake means for said second and third gear members.

2. The drive means of claim 1 wherein the brake means are of the calliper type.

3. In a compound helicopter having an anti-torque tail rotor and an adjacent rear propulsion propeller adapted to be coupled to a helicopter engine, rotor and propeller drive means therefor comprising a single planetary gear set including a central sun gear, a plurality of spur-type planet gears engaging said sun gear and an outer ring gear internally engaging said planet gears, means for driving the propulsion propeller by the planet gears, means for driving the tail rotor by the ring gear, calliper brake means for said propeller drive means, and calliper brake means for said tail rotor drive means.

4. The drive means of claim 3 wherein both brake means are disc brakes, the two disc brakes being coaxial, but axially offset.

5. The drive means of claim 4 wherein integral with the external surface of the ring gear is an outwardly projecting circumferential disc, said disc being a strengthening member for said ring gear and a disc for the tail rotor disc brake.

6. The drive means of claim 4 wherein the planet gears are connected to a drive shaft for the propulsion propeller and wherein the drive shaft carries the disc brake.

* * * * *